(12) United States Patent
Kidney et al.

(10) Patent No.: US 9,168,906 B2
(45) Date of Patent: Oct. 27, 2015

(54) METHOD OF ANALYZING STOPPING DISTANCE PERFORMANCE EFFICIENCY

(75) Inventors: Jacob R. Kidney, Wadsworth, OH (US);
John L. Turner, Tucson, AZ (US);
Ke-Jun Xie, Copley, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 159 days.

(21) Appl. No.: 14/005,509

(22) PCT Filed: Mar. 13, 2012

(86) PCT No.: PCT/US2012/028861
§ 371 (c)(1),
(2), (4) Date: Sep. 16, 2013

(87) PCT Pub. No.: WO2012/128996
PCT Pub. Date: Sep. 27, 2012

(65) Prior Publication Data
US 2014/0005883 A1    Jan. 2, 2014

Related U.S. Application Data

(60) Provisional application No. 61/454,227, filed on Mar. 18, 2011.

(51) Int. Cl.
*B60T 17/22* (2006.01)
*G01M 17/007* (2006.01)
*B60T 8/172* (2006.01)

(52) U.S. Cl.
CPC .............. *B60T 17/22* (2013.01); *B60T 8/172* (2013.01); *G01M 17/007* (2013.01); *B60T 2270/406* (2013.01)

(58) Field of Classification Search
CPC ................. B60R 16/02; B60B 21/02
See application file for complete search history.

(56) References Cited

U.S. PATENT DOCUMENTS 3,893,330 A    7/1975  Shute et al.
4,964,679 A    10/1990 Rath
(Continued)

FOREIGN PATENT DOCUMENTS

EP    1637863 A1    3/2006
JP    04328063 A    11/1992
(Continued)

OTHER PUBLICATIONS

Kurt M. Marshek, Jerry F. Cuderman II, and Mark J. Johnson, Performance of Anti-Lock Braking System Equipped Passenger Vehicles—Part III: Braking as a Function of Tire Inflation Pressure, Society of Automotive Engineers, Inc., 2002-01-0306, pp. 1-22.*
(Continued)

*Primary Examiner* — Thomas G Black
*Assistant Examiner* — Ana Thomas
(74) *Attorney, Agent, or Firm* — Shaun J. Fox; John Skeriotis

(57) ABSTRACT

Provided is a method for determining the efficiency of an ABS controller. The method may comprise performing a first test on a first tire using a first ABS controller at a first inflation pressure, gathering a first data set, using a digital computer to generate a first function from the first data set, and using a digital computer to calculate a first efficiency based on the first function. The first data set may comprise data about the first test. The first function may describe normalized mu versus time for a first time period.

13 Claims, 7 Drawing Sheets

(56) References Cited

U.S. PATENT DOCUMENTS

| | | | |
|---|---|---|---|
| 5,246,278 | A | 9/1993 | Yoshino et al. |
| 5,546,308 | A | 8/1996 | Yamamoto |
| 5,557,523 | A * | 9/1996 | Yeh et al. .................... 701/32.8 |
| 5,621,168 | A | 4/1997 | Kim et al. |
| 5,948,035 | A | 9/1999 | Tomita |
| 6,125,318 | A | 9/2000 | Zierolf |
| 6,339,956 | B1 | 1/2002 | Huinink et al. |
| 6,377,885 | B2 | 4/2002 | Yasui et al. |
| 6,434,470 | B1 | 8/2002 | Nantz et al. |
| 6,616,250 | B1 | 9/2003 | Fennel et al. |
| 6,671,609 | B2 | 12/2003 | Nantz et al. |
| 7,168,305 | B2 | 1/2007 | Narayanaswamy |
| 7,222,507 | B2 | 5/2007 | Wetzel et al. |
| 7,448,701 | B2 | 11/2008 | Nilsson et al. |
| 7,568,384 | B2 | 8/2009 | Morinaga |
| 7,617,721 | B2 | 11/2009 | McKeown et al. |
| 7,987,705 | B2 | 8/2011 | Mallet et al. |
| 2002/0095253 | A1 | 7/2002 | Losey et al. |
| 2004/0263324 | A1 | 12/2004 | Sanchez et al. |
| 2008/0110250 | A1 | 5/2008 | Jones |
| 2010/0217571 | A1 | 8/2010 | Mallet et al. |
| 2011/0015906 | A1 | 1/2011 | Bian et al. |

FOREIGN PATENT DOCUMENTS

| | | | | |
|---|---|---|---|---|
| JP | 05254418 | A | 10/1993 | |
| JP | 2002178729 | A * | 6/2002 | ............. B60C 23/06 |
| JP | 2008308116 | A * | 12/2008 | ............. B60R 16/02 |

OTHER PUBLICATIONS

Kurt M. Marshek, Jerry F. Cuderman II, and Mark J. Johnson, Performance of Anti-Lock Braking System Equipped Passenger Vehicles—Part III: Braking as a Function of Tire Inflation Pressure, Society of Automotive Engineers. Inc., 2002-01-0303, pp. 1-22.*

Jacob Kidney, Neel Mani, Vladimer Roth, John Turner, & Tom Branca, Experimental and Computational Studies of Contact Mechanics for Tire Longitudinal Response, $30^{th}$ Tire Society Conference, Sep. 14, 2011, pp. 1-18.*

Commissioner, International Search Report with Written Opinion from PCT/US2012/028861, 9 pp. (Oct. 23, 2012).

Colonna, Massimo, Extended European Search Report from European Application No. 12 760 985.7, 5 pp. (Aug. 4, 2014).

Hagita, Yusuke, English translation of Office Action issued in Japanese Patent Application No. 2013-558100, 2 pp. (Sep. 16, 2014).

* cited by examiner

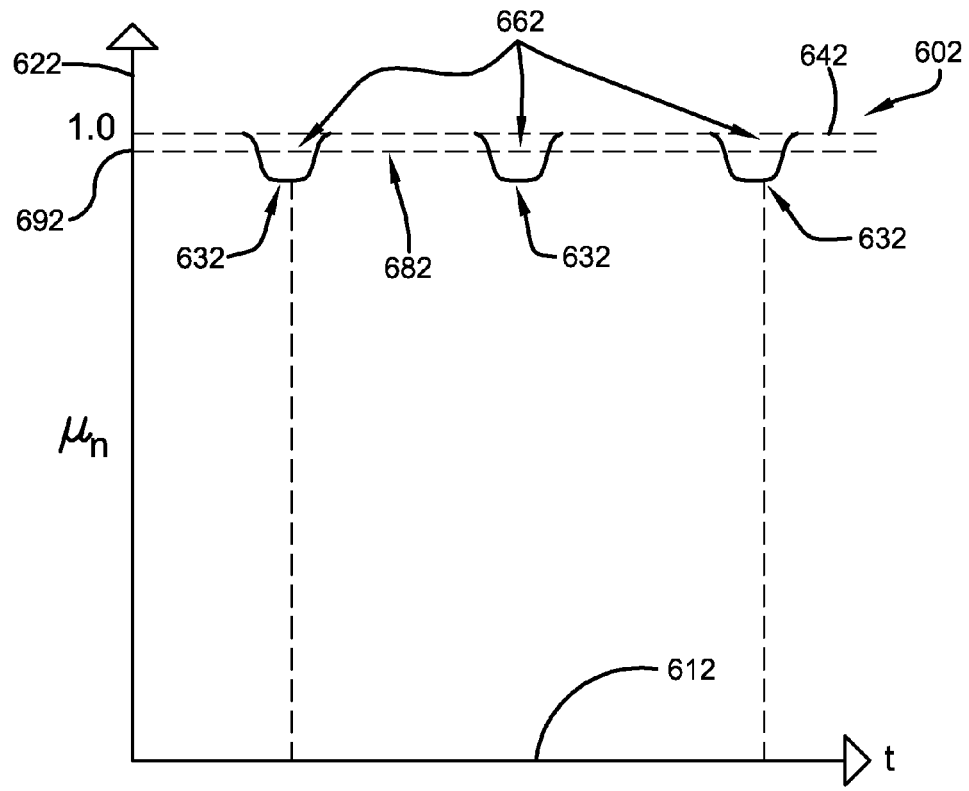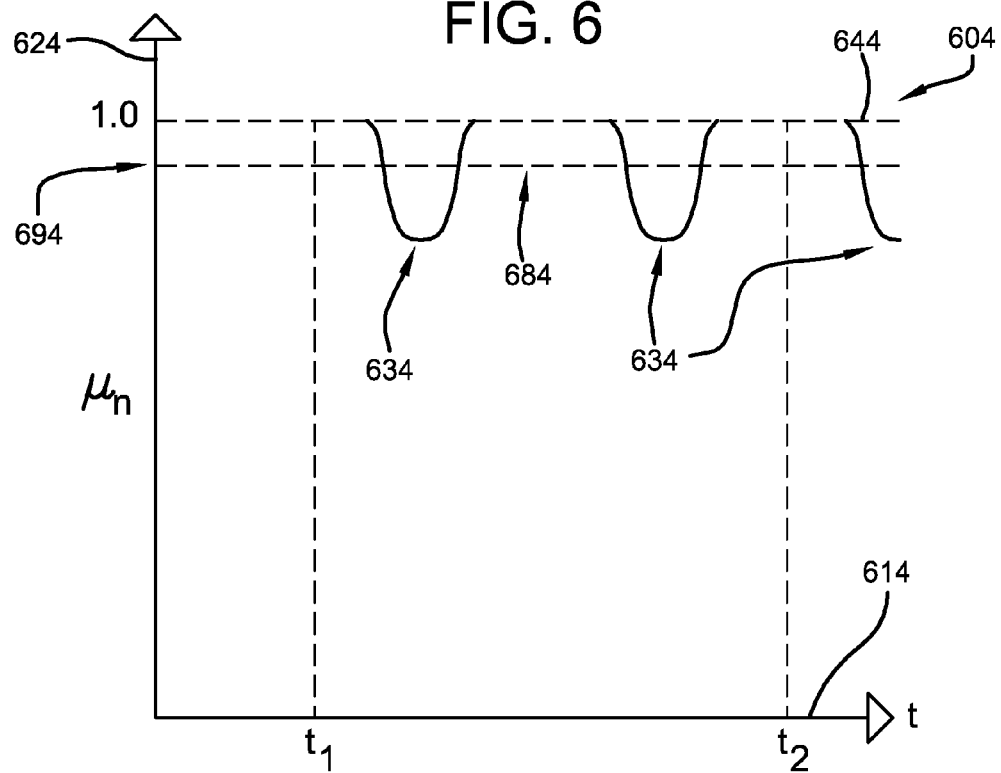
FIG. 6

METHOD OF ANALYZING STOPPING DISTANCE PERFORMANCE EFFICIENCY

TECHNICAL FIELD

The invention disclosed herein generally relates to tire testing or vehicle testing. More specifically, the invention disclosed herein relates to a method for analyzing performance efficiency of a tire-vehicle system or a component of a tire-vehicle system.

BACKGROUND

Tire performance is an important concern. In fact, manufacturers and tire developers, as well as others in the industry, find that the methods for testing (1) tire characteristics; (2) performance of tire-vehicle systems, and (3) performance of components of tire-vehicle systems are of substantial interest.

It is currently very common for a vehicle to comprise an anti-lock braking system (ABS). It is of interest to determine the "efficiency" (as defined herebelow) of an ABS/vehicle system for different tire properties (i.e., different mu-slip curve shapes) for potentially improving the match between tire and vehicle for improved stopping performance including, but not necessarily limited to, dry stopping performance. Put another way, if the tire mu-slip curve shape may be altered, it is of interest in determining what, if any, changes could be made to improve tire performance characteristics.

In considering a mu-slip curve and those properties that determine the form of the mu-slip curve, the curve may be considered to possess shape and size characteristics. Persons involved in the art may wish to evaluate the way in which "shape" may influence the ability of the ABS to operate efficiently at or near peak. "Peak mu" has a large effect on dry stopping distance (DSD) and other kinds of stopping distance, where it is often found that the higher peak mu, the better the stopping distance. Individuals of ordinary skill in the art may evaluate the influence of the curve shape characteristics, as described herebelow, on DSD and other types of stopping distance. Thus, it remains desirable to provide methods of testing performance of components of tire-vehicle systems.

SUMMARY

Provided is a method for determining the efficiency of an ABS controller. The method comprises performing a first test on a first tire using a first ABS controller at a first inflation pressure, gathering a first data set, using a digital computer to generate a first function from the first data set, and using a digital computer to calculate a first efficiency based on the first function. The first data set may comprise data about the first test. The first function may describe normalized mu versus time for a first time period.

Further provided is an apparatus for determining the efficiency of an ABS controller. The apparatus comprises a sensing system and a digital computer. The sensing system collects a first data set during a first test on a first tire using a first ABS controller at a first inflation pressure. The digital computer generates a first function from the first data set, wherein the first function describes normalized mu versus time for a first time period and calculates a first efficiency based on the first function.

Further provided is a method for determining the efficiency of an ABS controller. The method comprises performing a first vehicle test on a first tire using a first ABS controller at a first inflation pressure, gathering a first data set, using a digital computer to generate a first function from the first data set and using a digital computer to calculate a first efficiency based upon the first function. The first data set comprises data about the first test and comprises data sufficient to calculate mu as a function of time and slip ratio as a function of time. The first function describes normalized mu versus time for a first time period of steady operation. The method may further comprise, performing a second vehicle test on the first tire using the first ABS controller at a second inflation pressure, gathering a second data set, using a digital computer to generate a second function from the second data set, and using a digital computer to calculate a second efficiency based on the second function. The second data set then comprises data about the second test, and comprises data sufficient to calculate mu as a function of time and slip ratio as a function of time. The second function then describes normalized mu versus time for a second time period of steady operation. The method may also further comprise comparing the first efficiency and the second efficiency to determine if one of the first test at a first inflation pressure and the second test at the second inflation pressure produced a higher efficiency, and if so which test produced the higher efficiency. The method may yet further comprise performing a test using a second ABS controller.

BRIEF DESCRIPTION OF THE DRAWINGS

FIG. 6 is a generic set of graphs, a graph of a first set of sections of the normalized mu versus time graph and a graph of a second set of sections of the normalized mu versus time graph; and, FIG. 7 is graph of Dry stopping distance vs. Efficiency.

DETAILED DESCRIPTION

Reference will be made to the drawings, FIGS. 1-7, wherein the showings are only for purposes of illustrating certain embodiments of a diagnostic tire test method.

Figure 1:
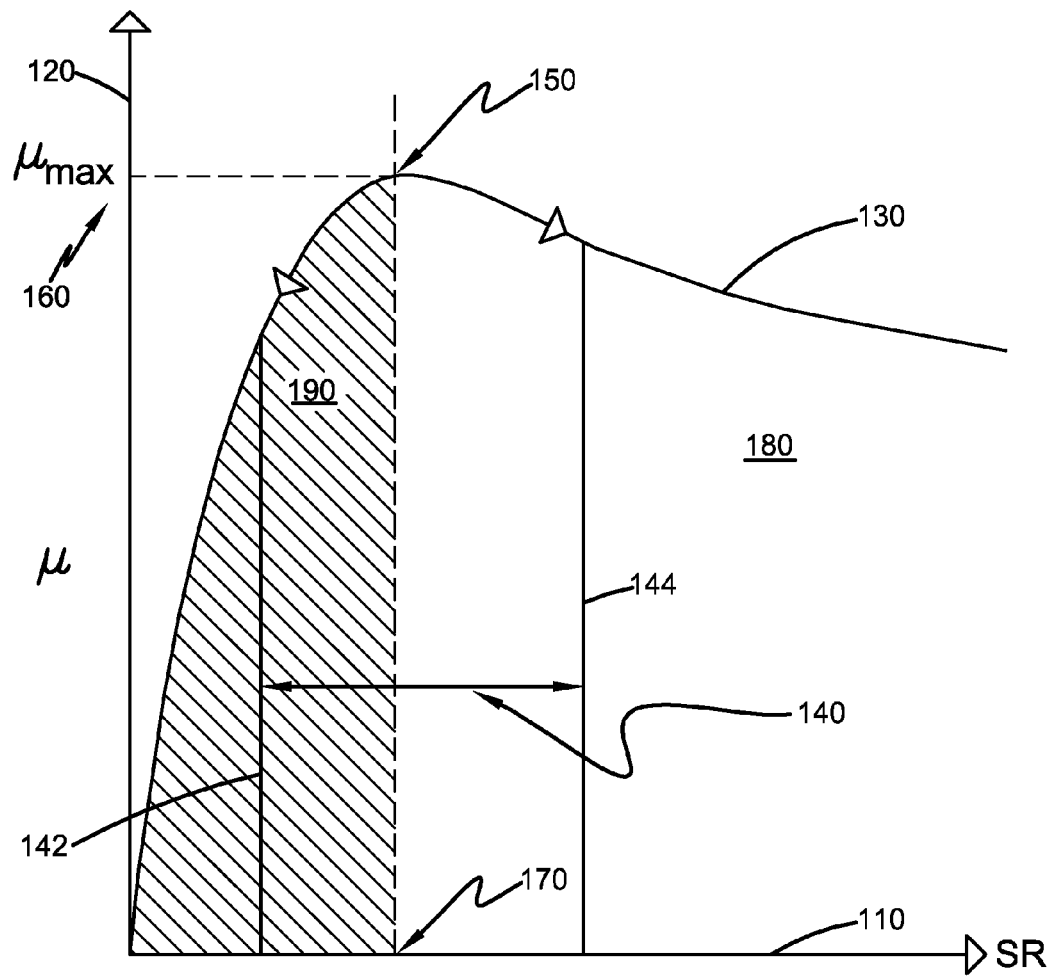
FIG. 1 is a generic graph showing a mu-slip curve.

A tire may be tested to determine tire properties. One such tire property is the nature of the mu-slip curve. An example of a mu-slip curve is shown in FIG. 1. The nature of the mu-slip curve is defined by the peak of the curve, as well as the shape of the curve. The peak of the mu-slip curve, or "peak mu" may have important effects on dry stopping distance. The shape of the mu-slip curve is determined by the initial slope of the curve, the curvature at or near peak mu, and the drop in mu past peak mu.

A method has been developed to determine the efficiency of an ABS for different tire properties. A determination of the efficiency of an ABS for different tire properties may provide information useful for making changes to tire properties. Some information useful for making changes to tire properties may include information useful for making predictions about how the changes to tire properties will affect tire-vehicle system performance. Without limitation, tire-vehicle system performance may comprise stopping performance.

The combination of a particular set of tires with a particular vehicle is a tire-vehicle system. In certain embodiments disclosed herein, a diagnostic tire test method involves testing a tire-vehicle system for stopping distance with a first tire, or set of tires, inflated to a first inflation pressure and testing the tire-vehicle system for stopping distance with the first tire, or set of tires inflated to a second inflation pressure. Inflation pressure may be referred to herein as "IP". In other embodiments, these methods may comprise traction testing a tire of a first tire specification at the first inflation pressure, or the second inflation pressure, or both. Without wishing to be bound to any particular theory, a change in the inflation pressure to which a tire is inflated during testing may influence how the tire-vehicle system responds during the stopping distance maneuver. In certain embodiments, testing may comprise collection of time information as part of the data.

In certain embodiments, it may be possible to temporarily alter a tire mu-slip curve by changing inflation pressure and conduct stopping distance tests, such as DSD testing, to gauge the "efficiency" of operation at each of multiple pressures. In certain embodiments, it may be possible to separately test the tires on a flat belt tire testing machine, also known as a "FlatTrac" or "Flat Track" to characterize the mu-slip curves at each inflation pressure. The resulting data may be used to establish the potential for improved performance due to curve shape changes. Curve shape characteristics may include, but are not limited to, initial slope, slip rate at peak mu, drop in mu past peak mu, etc. In certain embodiments, the test data may be analyzed to assess the "mu-shape" effect, independent of peak mu values which may dominate the overall stopping distance values, such as DSD values. Changing IP is one way to vary mu-slip behavior. Testing multiple tire sets is another way to vary mu-slip behavior. In certain embodiments, and without limitation, changing IP may be quicker and more convenient than testing multiple tire sets.

Stopping Distance Testing

In one embodiment, data regarding stopping distance of a tire-vehicle system is collected during the testing of the tire-vehicle system. The tire-vehicle system stopping distance testing provides data about the system stopping performance and/or system dry stopping performance. The tire-vehicle system stopping distance testing may be conducted on a track, proving grounds or other vehicle testing surface. Tire-vehicle system stopping distance testing may be conducted with an activated ABS to provide data about the performance of the ABS.

In certain embodiments, a test vehicle may be instrumented with sensors to capture the behavior of the tire-vehicle system during a stopping maneuver. A typical stopping maneuver comprises a braking operation contemporaneously with, or prior to, data collection regarding, or sufficient to calculate stopping distance, wheel position, slip rate, braking force in the longitudinal direction or other directions, displacement in the longitudinal direction or other directions, velocity in the longitudinal direction or other directions, acceleration in the longitudinal direction or other directions, braking force in the longitudinal direction with respect to slip rate, or some combination or sub-set thereof. A stopping maneuver comprises a braking operation and may also comprise a steering operation. A stopping maneuver and the associated data collection are referred to as a stopping distance test. A stopping distance test comprises braking a vehicle from an initial speed to a final speed, which final speed is some non-zero speed or zero. A stopping distance test may comprise, steering a vehicle along a curved or straight path. A stopping distance test may also include activation of an ABS.

In certain tire and vehicle systems, the results of a stopping distance test, including the stopping distance, may be affected by inflation pressure such that a stopping distance advantage may be noticed at one of the inflation pressures such as, a shorter stopping distance, a more efficient stopping operation, or otherwise.

Stopping distance tests are performed on a testing surface. Testing surfaces can comprise a track, roadway or other surface and the testing surface can be dry, wet, snow-covered, icy or a mixture thereof. The actual testing surface foundation can be concrete, asphalt, brick, gravel, sand, dirt, or some combination thereof.

A first set of stopping distance tests may comprise a first stopping distance test performed on a first tire-vehicle system, comprising a first vehicle and a first tire and a second stopping distance test performed on the first tire-vehicle system. In certain embodiments, a first set of stopping distance tests may comprise a first stopping distance test performed on a first tire-vehicle system, comprising a first vehicle and a first tire, and a second stopping distance test performed on a second tire-vehicle system comprising the first vehicle and a second tire. A tire-vehicle system may be tested at a plurality of tire inflation pressures. A first set of stopping distance tests may further include additional stopping distance tests performed on the first vehicle using a second tire, and, optionally, using one or more subsequent tires.

Testing may comprise a second set of stopping distance tests analogous to the first set of stopping distance tests. A second set of stopping distance test may comprise tests performed on a second vehicle using the first tire, on the second vehicle using the second tire, and, optionally, tests performed on a second vehicle using one or more subsequent tires.

Testing may comprise one or more additional sets of stopping distance tests analogous to the first set of stopping distance tests or to another set of stopping distance tests. Additional sets of stopping distance tests may comprise tests performed on one or more additional vehicles using the first tire, on the one or more additional vehicles using the second tire, and, optionally, tests performed on the one or more additional vehicles using one or more subsequent tires.

Stopping distance tests of tire-vehicle systems may be conducted on a plurality of vehicles, each with a plurality of tires, at a plurality of inflation pressures.

Stopping distance tests of tire-vehicle systems may be conducted on a first vehicle engaged with a first tire inflated to a first inflation pressure and on the first vehicle engaged with the first tire inflated to a second inflation pressure. Stopping distance tests of tire-vehicle systems may be conducted on a first vehicle engaged with a first tire inflated to a first inflation pressure and on the first vehicle engaged with the first tire inflated to a second inflation pressure, and, optionally, one or more additional stopping distance may be conducted on the first vehicle engaged with the first tire wherein each test is conducted with the first tire inflated to another inflation pressure. Stopping distance tests of tire-vehicle systems may be conducted with an initial speed of less than 322 kph (200 mph). Stopping distance tests of tire-vehicle systems may be conducted with an initial speed of 100 kph (62 mph). In certain embodiments, stopping distance tests of tire-vehicle systems may be with a final speed of 1 kph (0.62 mph) or 0 kph (0 mph). The "stopping distance" in a stopping distance test is the distance traveled while slowing from the initial speed to the final speed. As noted above, the "stopping distance" in a stopping distance test is not necessarily the distance traveled while slowing from the initial speed to 0 kph (0 mph) since the final speed is not necessarily 0 kph (0 mph). Stopping distance tests of tire-vehicle systems may be conducted upon multiple vehicles, upon multiple tires, at multiple inflation pressures, at multiple initial speeds, and/or multiple final speeds.

In certain embodiments, a test vehicle, or test tire, or a wheel upon which a tire is mounted or a wheel upon which a tire is to be mounted, is instrumented with one or more sensors. In certain embodiments, a test track or test roadway or a patch thereof is instrumented with one or more sensors. A sensor is adapted to capture data regarding the behavior of a tire or vehicle or tire-vehicle system. A sensor may be part of a sensing system enabled to collect data regarding, or sufficient to calculate, stopping distance, wheel position, slip rate, braking force in the longitudinal direction or other directions, displacement in the longitudinal direction or other directions, velocity in the longitudinal direction or other directions, acceleration in the longitudinal direction or other directions, braking force in the longitudinal direction with respect to slip rate, or some combination thereof. A sensing system may comprise a sensor, a data storage device, a data processing device, a digital to analog converter, an analog to digital converter, a communication device, or a combination thereof.

A vehicle may be instrumented with a wheel encoder and a velocity sensor adapted to acquire data such as, without limitation, dry stopping distance, vehicle position, vehicle velocity, vehicle acceleration, wheel angular position, wheel angular velocity, wheel angular acceleration, or a combination thereof, or to acquire data sufficient to permit calculation thereof.

One or more stopping maneuvers may be made with a tire-vehicle system prior to conducting a stopping maneuver from which or during which data is acquired. In certain embodiments, a stopping maneuver made with a tire-vehicle system prior to conducting stopping maneuvers from which or during which data is acquired is a conditioning maneuver and may be useful for conditioning or breaking in a tire or tire-vehicle system.

Tire Traction Testing

Without limitation, tire mu-slip curves may be characterized via experimental testing. Experimental testing may be performed using a Flat Track or similar method. In certain embodiments, testing may be performed at multiple inflations to define the differences.

Many modern vehicles comprise ABS controllers. ABS controllers if activated interact with tire mu-slip response in stopping distance performance testing.

Testing may comprise a traction test instead of, or in addition to, a stopping distance test. Testing may comprise a traction test of the tires tested or to be tested in a stopping distance test, or a tire of the same specification as the tires tested or to be tested in a stopping distance test, at the same or very similar inflation pressure or pressures. In certain embodiments, inflation pressures are precise to within approximately 1 psi. A traction test produces data about Fx, mu, slip rate, Fx-slip, or mu-slip. Mu is the force in the longitudinal direction, Fx, divided by the force in the normal direction, Fz, such that mu is Fx/Fz. Slip rate is the percentage of the difference between the surface speed of the wheel compared to the speed between axis and road surface; Slip Rate=$(\omega r-v)/v$, where $\omega$ is rotational speed of the wheel, r is wheel radius and v is vehicle speed. Mu-slip data is mu with respect to slip rate, or slip rate with respect to mu. A mu-slip curve is a graph of multiple mu-slip data points. A non-limiting generic graph showing a curve plotting mu-slip data, a mu-slip curve, is shown in FIG. 1. An understanding of the nature of the mu-slip characteristics of a tire-vehicle system may make it possible to engineer changes thereto to affect braking performance. Accordingly, acquiring the mu-slip data for a tire of interest.

Mu-slip data may be acquired with either indoor or outdoor tire traction testing.

In certain embodiments, tire traction testing produces multiple mu-slip curves for each tire by traction testing the tire and multiple inflation pressures with each such mu-slip curve corresponding to a single inflation pressure.

Without limitation, in certain embodiments, indoor tire traction testing may be performed on a flat belt tire testing machine ("Flat Track"), such as, without limitation, an MTS Flat-Trac® Tire Test System, the flat belt tire test machine at Calspan TIRF, or a similar machine. In some situations, a FlatTrac machine must be properly tuned to provide well-defined mu-slip curves. A Flat Track may test a tire on a substantially flat roadway simulation surface at a desired roadway speed, normal force, braking load, slip angle, slip rate, inflation pressure, and camber angle within machine limits.

Data Processing

The data, whether obtained by the methods disclosed above, or by any other means, may be processed as described herein. Data from stopping distance tests and mu-slip data may be used to construct analyses about the "efficiency" of the tire-vehicle systems. Mu-slip data and a mu-slip graph typically comprise a peak or maximum mu. As used herein, unless otherwise noted, "efficiency" is a measure of how well the tire-vehicle system maintains performance at the maximum mu. Efficiency is a measurement of the ability of the system to maintain braking operation at or near the peak capacity of the tire-vehicle system. Note that efficiency does not necessarily correlate with stopping distance. In certain embodiments, without limitation, for different tires with different maximum mu, a higher efficiency may have a longer stopping distance.

Using the field data and the tire mu-slip curves, it is possible to construct the analyses described below to generate "efficiency" values for each set of tire properties. Note that a "total efficiency" of 1.0 indicates that the tire maximum potential (peak mu) is fully utilized. The greater time spent at SR's to each side of "peak", i.e., away from peak mu, the lower the efficiency will be. Also note that the efficiency value does not reflect DSD value, i.e., for different tires with different peak mu's, a higher efficiency system could have a longer DSD (due to lower peak mu). Efficiency, as used herein, is intended to reflect the ability of the system to maintain operation near the peak capacity of the tires.

FIGS. 1-6 shows an embodiment of a derivation of ABS efficiency. That is, the figures illustrate the concept on which the derivation of efficiency is based. As shown, an ABS controller's efficiency with a given tire may be defined as the averaged value of the normalized mu of that tire during part or all of the steady operating period of the ABS controller. In other embodiments, an ABS controller's efficiency with a given tire may be defined as the averaged value of the normalized mu of that tire during another operating period of the ABS controller. As used herein the steady operating period of the ABS controller is a period during which the ABS operation produces a smooth, substantially repeatable cycle of slip ratio vs. time. A steady operating period may be defined by a start time at t0 and an end time at t1. In some embodiments, the start time, t0, is concurrent with the time when the ABS controller is activated and takes over the brake pressure application and the end time, t1, is greater than or equal to the time when the ABS controller has undergone one full brake pressure apply/release cycle following t0. In some embodiments, the start time, t0, is some time after the time when the ABS controller is activated and takes over the brake pressure application and the end time, t1, is greater than or equal to the time when the ABS controller has undergone one full brake pressure apply/release cycle following t0. In certain embodiments, t0 is about 0.5 seconds after the time when the ABS controller is activated and t1 is about 2.0 seconds after the time when the ABS controller is activated.

A normalization may be used when tires with varying levels of peak mu are involved since it normalizes peak mu influences on efficiency, DSD, or other stopping distance.

Mu-slip data may be plotted as a mu-slip graph. As noted above, FIG. 1 shows a non-limiting example of a mu-slip graph. In FIG. 1, the horizontal axis 110 represents slip ratio ("SR"), the vertical axis 120 represents mu, the curve 130 is the graph fitted to the mu-slip data, the slip ratio range 140, bounded by lower slip ratio range limit 142 and upper slip ratio range limit 144, is a steady operating zone. The point 150, the peak point, is of particular interest; it is the point where mu is maximum and may be referred to by coordinates ($SR_{peak}$, $mu_{max}$). As shown in FIG. 1, $mu_{max}$ corresponds to the mu at the point 160 on the vertical axis. As shown in FIG. 1, $SR_{peak}$ corresponds to the slip ratio at the point 170 on the horizontal axis. That is, the peak of the mu-slip graph, the point $SR_{peak}$, $mu_{max}$ 150 is the maximum mu, $mu_{max}$, and it defines the slip ratio at peak, $SR_{peak}$. As noted above, mu is the ratio Fx/Fz and $mu_{max}$ is ratio $Fx_{max}$/Fz.

As shown in FIG. 1, in embodiments in which the mu-slip curve 130 comprises a peak point 150, the mu-slip curve 130 drops off to either side of the peak point 150. The greater the time spent at the slip ratio to either side of the peak point 150, the lower the efficiency will be. In certain embodiments, a braking system will be adapted to adjust braking variables in order to seek performance at and/or proximate to the peak point 150 of the mu-slip curve 130. The region wherein the slip ratio is greater than $SR_{peak}$ will be referred to herein as the overshoot region 180. The region where the slip ratio is less than $SR_{peak}$ will be referred to herein as the drop off region 190.

Figure 2:
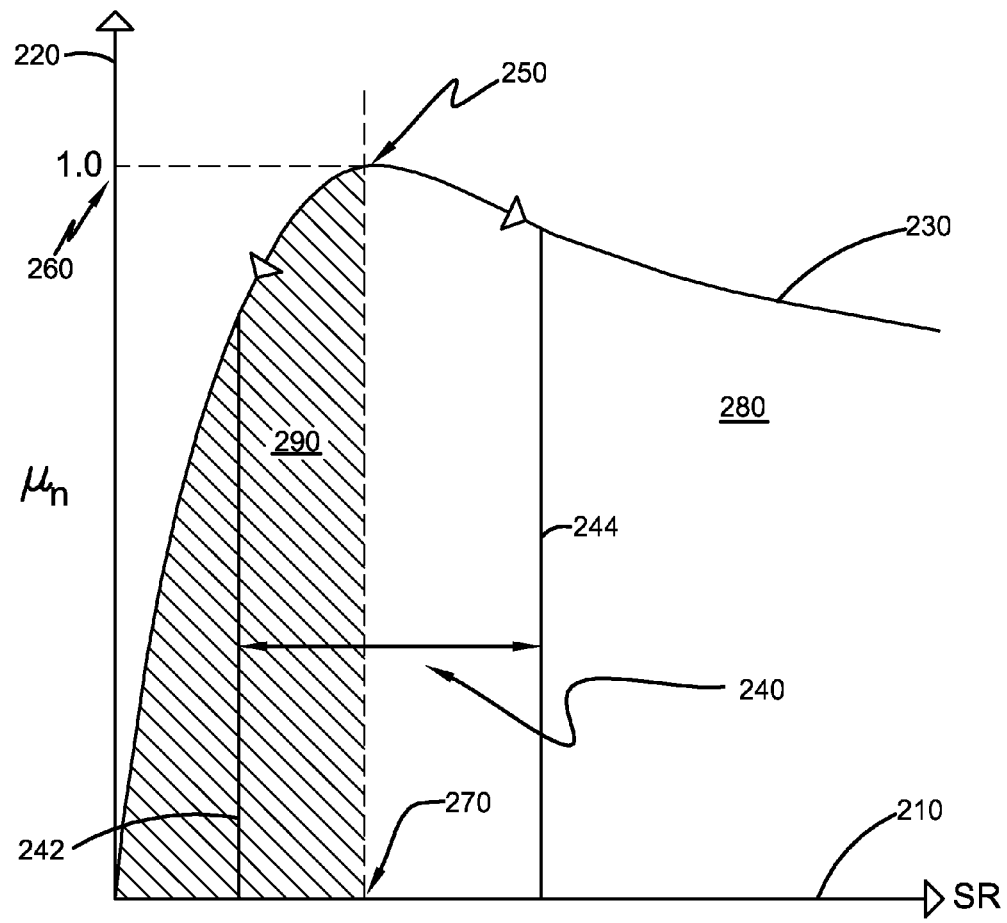
FIG. 2 is a generic graph showing a normalized mu-slip curve.

As shown in FIG. 2, and without limitation, mu-slip data may be plotted as a normalized mu-slip curve 230. In a normalized mu-slip curve 230, the normalized mu data is plotted against the slip ratio. In certain embodiments, normalized mu data is created by dividing the mu data by some normalization factor. In certain embodiments, as shown in FIG. 2, the normalization factor is $mu_{max}$, such that normalized mu data is created by dividing the mu data by $mu_{max}$. In a normalized mu-slip curve wherein the normalized mu data is created by dividing the mu data by $mu_{max}$, the peak of the normalized mu-slip curve occurs at the point ($SR_{peak}$, 1.0). In certain embodiments, for comparing ABS controller efficiencies for different tire properties, all of the mu-slip curves may be normalized to a max value of 1.0 Normalizing the mu-slip curves to a max value of 1.0 may help to better distinguish the mu-slip curve "shape" differences when peak values differ.

In FIG. 2, the horizontal axis 210 represents slip ratio, the vertical axis 220 represents normalized mu, the curve 230 is the graph fitted to the normalized mu-slip data, the slip ratio range 240, bounded by lower slip ratio range limit 242 and upper slip ratio range limit 244, is the steady operating zone. The peak point 250 is the point where normalized mu is maximum and may be referred to by coordinates ($SR_{peak}$, 1.0). As shown in FIG. 2, the peak normalized mu corresponds to the point at which normalized mu is 1.0 at the point 260 on the vertical axis. As shown in FIG. 2, $SR_{peak}$ corresponds to the slip ratio at the point 270 on the horizontal axis. The peak of the mu-slip graph, the point $SR_{peak}$, 1.0 250 is the maximum normalized mu, 1.0, and it defines the slip ratio at peak, $SR_{peak}$. As noted above, normalized mu is the ratio $mu/mu_{max}$. Region where the slip ratio is greater than $SR_{peak}$ will be referred to herein as the overshoot region 280. The region where the slip ration is less than $SR_{peak}$ will be referred to herein as the drop off region 290.

Figure 3:
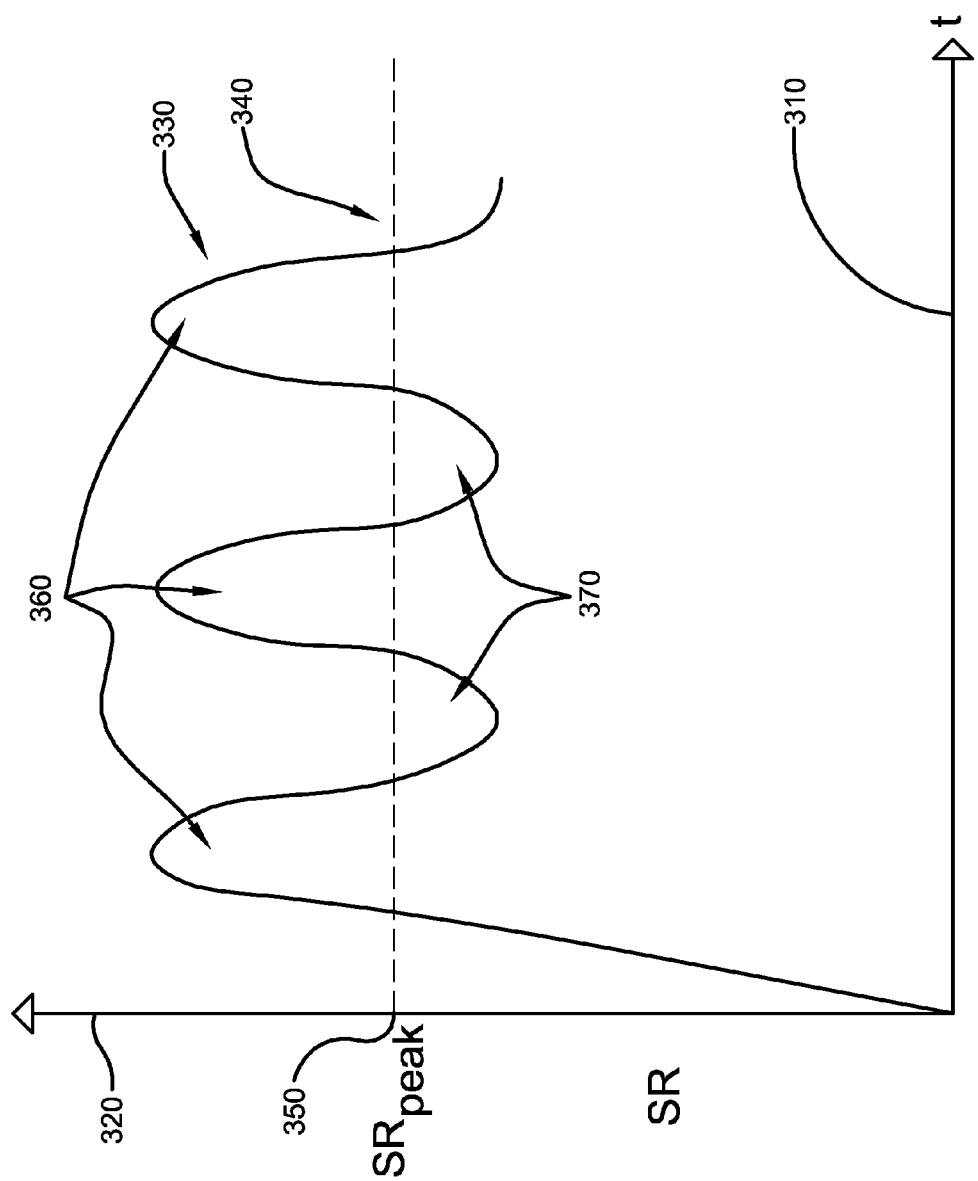
FIG. 3 is generic graph showing slip ratio versus time.

In certain embodiments, testing allows collection or calculation of slip ratio data as a function of time, or mu data as a function of time, or both. In certain embodiments, and without limitation, SR (slip ratio) time histories may be measured from the vehicle wheels during actual ABS stopping distance tests for different tires with encoders or other measurement devices. FIG. 3, shows a plot of slip ratio as a function of time.

In FIG. 3, the horizontal axis 310 represents time, the vertical axis 320 represents slip ratio, the curve 330 is a plot of slip ratio as a function of time. As shown in FIG. 3, a plot of slip ratio as a function of time may show a cyclic pattern in which the slip ratio cycles about the peak slip ratio as time progresses. That is, the curve 330 oscillates about a slip ratio corresponding to $SR_{peak}$, as indicated by the dashed line 340 intersecting the vertical axis 320 at $SR_{peak}$ 350. An overshoot region 360 is a region on the graph corresponding to operation past peak, i.e., above peak. There are three overshoot regions 360 identified in FIG. 3. A drop off region 370 is a region on the graph corresponding to operation pre-peak, i.e., before peak. There are two drop off regions 370 identified in FIG. 3.

Figure 4:
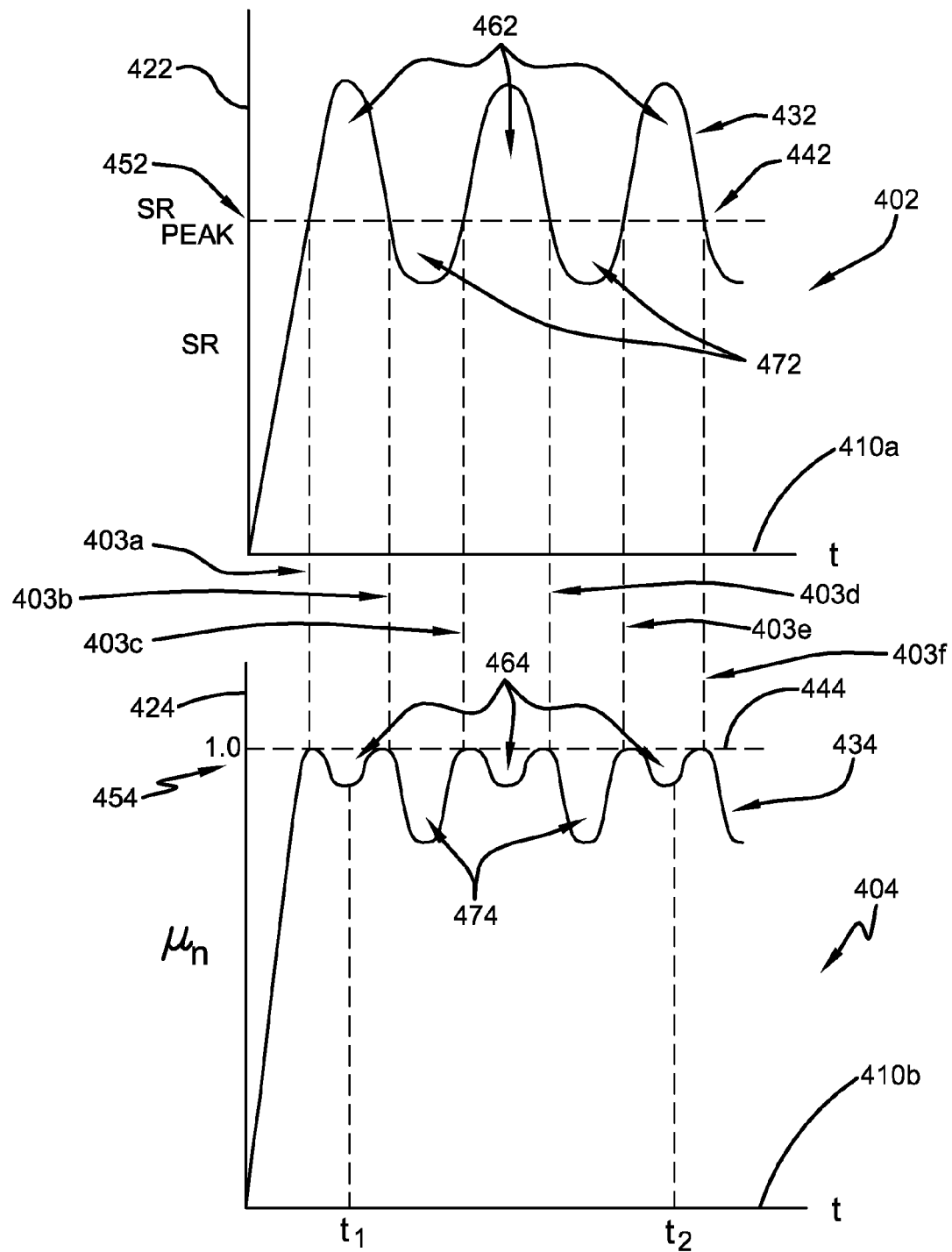
FIG. 4 is a generic set of graphs, a graph of slip ratio versus time and a graph of normalized mu versus time.

FIG. 4 shows two graphs, a top graph 402 and a bottom graph 404, both expressing variables plotted against an identical time axis 410a and 410b. That is, the graphs in FIG. 4 both show a time axis, 410a in graph 402, and 410b in 404, and the time axis in each graph is the same as the time axis in the other graph, such that, the data in each graph may be readily compared to the other graph at a given time. The top graph 402 shows the same data as the graph in FIG. 3. The vertical axis 422 in graph 402 represents slip ratio, the curve 432 is a plot of slip ratio as a function of time. The curve 432 oscillates about a slip ratio corresponding to $SR_{peak}$, as indicated by the dashed line 442 intersecting the vertical axis 422 at $SR_{peak}$ 452. An overshoot region 462 is a region on the graph corresponding to operation past peak, i.e., above peak. There are three overshoot regions 462 identified in graph 402 of FIG. 4. A drop off region 472 is a region on the graph corresponding to operation pre-peak, i.e., before peak. There are two drop off regions 472 identified in graph 402 of FIG. 4.

The bottom graph 404 is the graph of normalized mu, $\mu_n$, plotted against time. The vertical axis 424 in graph 404 represents normalized mu, $\mu_n$; the curve 434 is a plot of normalized mu, $\mu_n$, as a function of time. As noted above, the horizontal axis 410b in graph 404 represents time. The curve 434 is defined by a complex waveform that repeatedly oscillates against the dashed line 444. Dashed line 444 intersects the vertical axis 424 at the point 454 where normalized mu is equal to 1.0. An overshoot region 464 is a region on the graph corresponding to operation past peak, i.e., above peak. There are three overshoot regions 464 identified in graph 404 of FIG. 4. A drop off region 474 is a region on the graph corresponding to operation pre-peak, i.e., before peak. There are two drop off regions 474 identified graph 404 of FIG. 4.

The alignment of graph 402 and graph 404 along similar time axes allows comparisons of the data in each with time. As indicated by the isotemporal lines 403 extending between graphs 402 and 404, at those times when the slip ratio in graph 402 is equal to $SR_{peak}$, the normalized mu, $\mu_n$ is equal to 1.0. Normalized mu, $\mu_n$, drops off at those times when, the slip ratio is not equal to $SR_{peak}$. Efficiency from a first time, $t_1$, to a second time, $t_2$, can be calculated as shown in Equation A.

Equation A

Figure 5:
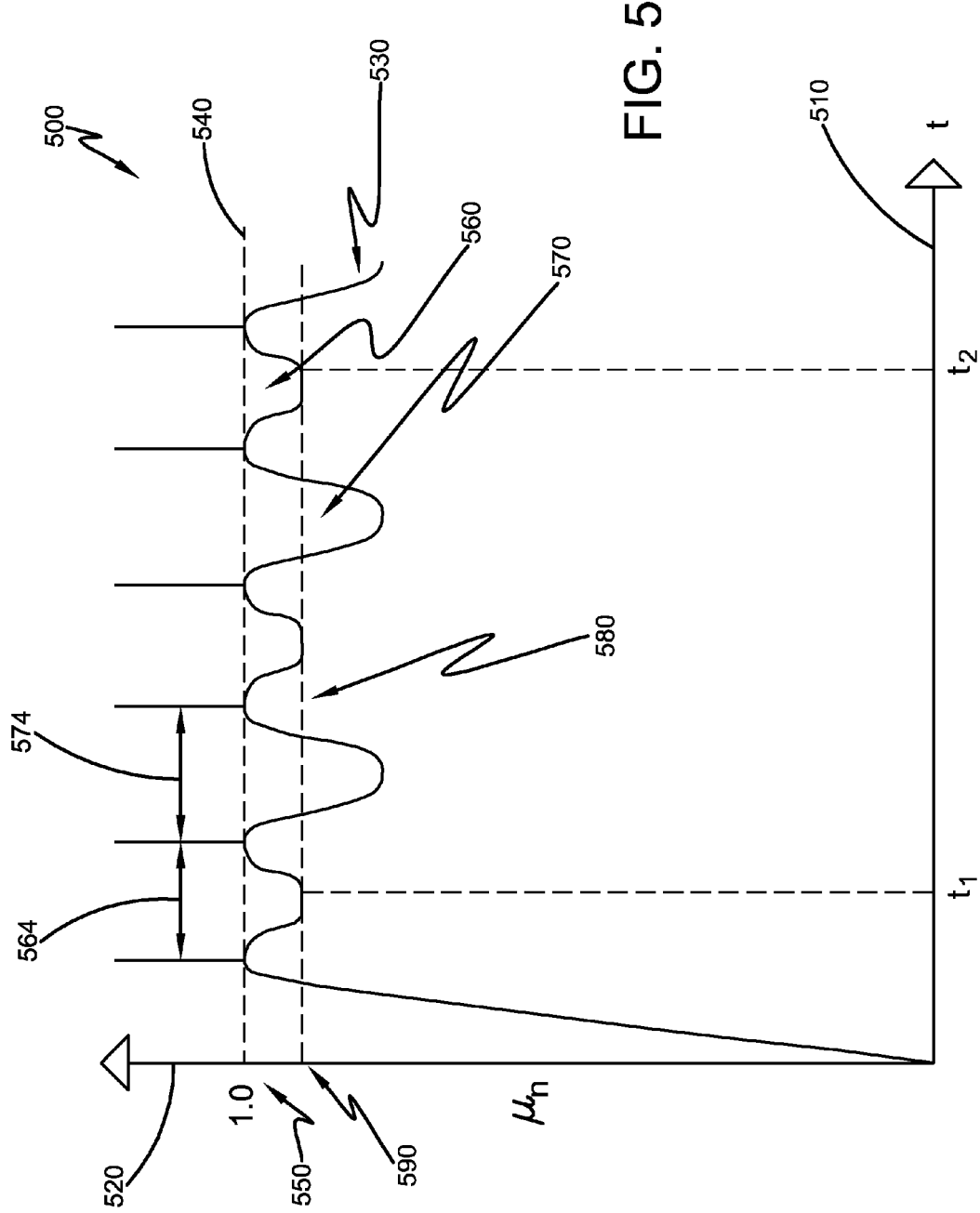
FIG. 5 is a generic graph of normalized mu versus time.

The graph in FIG. 5 shows the data curve from the bottom graph 404 in FIG. 4. FIG. 5 shows a graph 500 of normalized mu, $\mu_n$, plotted against time. The vertical axis 520 in graph 500 represents normalized mu, $\mu_n$; the horizontal axis 510 in graph 500 represents time; the curve 530 is a plot of normalized mu, $\mu_n$, as a function of time. The curve 530 is defined by a complex waveform that repeatedly oscillates against the first dashed line 540. Dashed line 540 intersects the vertical axis 520 at the point 550 where normalized mu is equal to 1.0. An overshoot region 560 is a region on the graph corresponding to operation past peak, i.e., above peak. The band 564 indicates a time interval corresponding to overshoot. A drop off region 570 is a region on the graph corresponding to operation pre-peak, i.e., before peak. The band 574 indicates a time interval corresponding to drop off.

Unlike FIG. 4, FIG. 5 includes a second dashed line 580. The dashed line 580 indicates the average value 590 for the data curve 530 calculated using Equation A. The average value 590 for the data curve 530 is the total efficiency.

The data curve 530 shown in FIG. 5 reveals that once braking testing began, the system quickly moved to, or did a "ramp-up" to, operation at $SR_{peak}$; that the system ran past the $SR_{peak}$ into the overshoot region 564; that the system reduced the slip ratio until it returned to $SR_{peak}$; that the system ran past $SR_{peak}$ into the drop off region 574; and that the system continued this cycle of alternating between operation in an overshoot region and a drop off region. The resulting graph in FIG. 5 shows a signature performance corresponding to operation alternating between operation in an overshoot region and a drop off region. In the embodiment shown, and without limitation, performance in any of the overshoot regions shows a moderate reduction in efficiency, while performance in any of the drop off regions shows a greater reduction in efficiency. This latter distinction in the reduction in efficiency is not intended to be limiting, but rather to aid in identification of the cyclical nature of the performance shown in this particular embodiment. Accordingly, FIG. 5 can be described as being comprised of three regions, a first region being the region in which the braking system quickly moved to, or did a "ramp-up" to, operation at $SR_{peak}$; a second region being the set of all regions corresponding to operation in an overshoot region; and a third region being the set of all regions corresponding to operation in a drop off region.

FIG. 6 shows two graphs, the top graph 602 and the bottom graph 604. The top graph 602 corresponds to the set of all regions corresponding to operation in an overshoot region 662. The bottom graph 604 corresponds to the set of all regions corresponding to operation in a drop off region 674. The vertical axis 622 in graph 602 represents normalized mu, $\mu_n$; the horizontal axis 612 in graph 602 represents time; the discontinuous curve 632 is the set of overshoot regions of a plot of normalized mu, $\mu_n$, as a function of time. The vertical axis 624 in graph 604 represents normalized mu, $\mu_n$; the horizontal axis 614 in graph 604 represents time; the discontinuous curve 634 is the set of drop off regions of a plot of normalized mu, $\mu_n$, as a function of time. Efficiency can also be computed separately for operation past peak (denoted overshoot) and for operation pre-peak (denoted drop off). This may have value in specifically defining how the efficiency of controller operation differs between tire sets and what aspects of the ABS controller interaction with the mu-slip curves account for lost performance. Similar to the efficiency calculation described above for the region from a first time, $t_1$, to a second time, $t_2$, an efficiency can be calculated for a subset of the region from a first time, $t_1$, to a second time, $t_2$.

A subset for which an efficiency can be calculated is the set of all regions corresponding to operation in an overshoot region 662; the dashed line 682 indicates the average value 692 for the discontinuous data sets 632. The average value 692 for the discontinuous data sets 632 is the overshoot efficiency; that is, the efficiency calculated for the data shown in graph 602 may be referred to as overshoot efficiency. A subset for which an efficiency can be calculated is the set of all regions corresponding to operation in a drop off region 674; the dashed line 684 indicates the average value 694 for the discontinuous data sets 634. The average value 694 for the discontinuous data sets 634 is the drop off efficiency; that is, the efficiency calculated for the data shown in graph 604 may be referred to as drop off efficiency.

With reference to the isotemporal lines 403 in FIG. 4, from left to right 403a, 403b, 403c, 403d, 403e, and 403f, and recalling that the time axis in FIGS. 5 and 6 are identical to those in FIG. 4, the Overshoot efficiency and Dropoff efficiency may be calculated as follows:

Further, these efficiency calculations may be expanded readily to an arbitrarily large number of discontinuous regions, a, b, etc. in each subset using analogous methods as follows, where a0 is the start time for region a, a1 is the final time for region a, b0 is the start time for region b, b1 is the final time for region b, etc.

Figure 7:
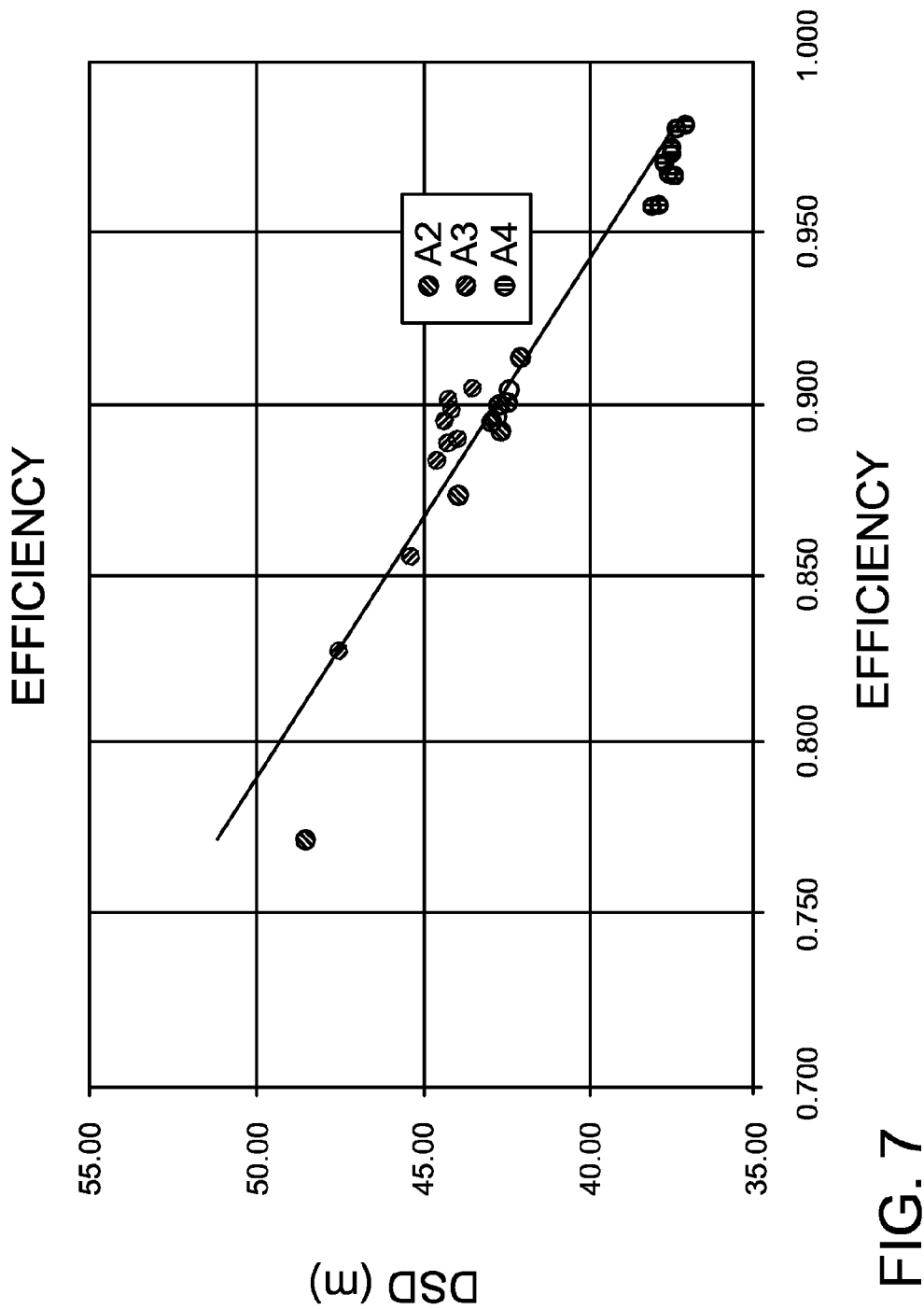

FIG. 7 is a graph of Dry stopping distance vs. Efficiency calculated using CarSim dry stopping distance calculations of simulations of a first test vehicle, "Vehicle A", with three ABS, A2, A3, and A4. As shown in the graph efficiency correlates well with a decrease in dry stopping distance. According to the information in FIG. 7, it is possible to place the three ABS, A2, A3, and A4, in a hierarchy, showing that the A2 ABS has the highest efficiency and the shortest dry stopping distance of the simulated ABS systems. Based on this information, it may be predicted that the A2 ABS would provide shorter dry stopping distance than either the A3 or A4 ABS when used on the tire-vehicle system of interest in the simulation.

Any of the calculations described herein may be performed using a digital computer.

While the method of analyzing stopping distance performance efficiency has been described above in connection with the certain embodiments, it is to be understood that other embodiments may be used or modifications and additions may be made to the described embodiments for performing the same function of the method of analyzing stopping distance performance efficiency without deviating therefrom. Further, the method of analyzing stopping distance performance efficiency may include embodiments disclosed but not described in exacting detail. Further, all embodiments disclosed are not necessarily in the alternative, as various embodiments may be combined to provide the desired characteristics. Variations can be made by one having ordinary skill in the art without departing from the spirit and scope of the method of analyzing stopping distance performance efficiency. Therefore, the method of analyzing stopping distance performance efficiency should not be limited to any single embodiment, but rather construed in breadth and scope in accordance with the recitation of the attached claims.

What is claimed is:

1. A method for determining efficiency of a tire-vehicle-ABS system comprising the steps of:
   (A) providing a vehicle with a wheel;
   (B) providing the vehicle with a first ABS controller that is operable to control braking of the wheel;
   (C) providing a first tire made according to a first specification;
   (D) defining a first tire-vehicle-ABS system as the combination of the vehicle, the first ABS controller and the first tire;

(E) inflating the first tire to a first inflation pressure;
(F) collecting mu-slip data for the first tire at the first inflation pressure;
(G) providing the first tire at the first inflation pressure on the wheel;
(H) performing a first stopping distance test on the first tire-vehicle-ABS system under the conditions of step (G) to create stopping distance data;
(I) inflating the first tire to a second inflation pressure;
(J) collecting mu-slip data for the first tire at the second inflation pressure;
(K) providing the first tire at the second inflation pressure on the wheel;
(L) performing a second stopping distance test on the first tire-vehicle-ABS system under the conditions of step (K) to create stopping distance data;
(M) using the collected mu-slip data from the first tire at the first and second inflation pressures to: (1) determine peak mu and slip ratio at peak mu; and, (2) create a data curve of normalized mu versus time; and,
(N) using the data curve of normalized mu versus time to calculate efficiency of the first tire-vehicle-ABS system.

2. The method of claim 1 wherein after step (N) the method comprises the step of:
producing a second tire made according to a second specification: (1) based on the calculated efficiency; and, (2) having better stopping distance performance on the vehicle with the first ABS controller than the first tire made according to the first specification.

3. The method of claim 1 wherein step (N) comprises the step of:
calculating the efficiency by taking an average value of the data curve of normalized mu versus time.

4. The method of claim 1 wherein step (N) comprises the step of:
calculating the efficiency by performing an area integration of the data curve of normalized mu from a first time to a second time and then divide the integral by the difference between the second time and the first time.

5. The method of claim 1 wherein step (N) comprises the step of:
calculating the efficiency during a steady operating period of the first ABS controller during which the first ABS controller produces a smooth, substantially repeatable cycle of slip ratio versus time.

6. The method of claim 5 wherein step (N) comprises the steps of:
beginning the steady operating period when or after the first ABS controller is activated and takes over a brake pressure application; and,
ending the steady operating period when or after the ABS controller has undergone one full brake pressure apply/release cycle after the beginning of the steady operating period.

7. The method of claim 5 wherein step (N) comprises the steps of:
beginning the steady operating period about 0.5 seconds after the first ABS controller is activated and takes over a brake pressure application; and,
ending the steady operating period about 2.0 seconds after the first ABS controller is activated and takes over the brake pressure application.

8. The method of claim 1 wherein:
step (F) comprises the step of: collecting the mu-slip data for the first tire at the first inflation pressure using a tire traction test device; and,
step (J) comprises the step of: collecting the mu-slip data for the first tire at the second inflation pressure using the tire traction test device.

9. The method of claim 1 wherein:
step (F) comprises the step of: collecting the mu-slip data for the first tire at the first inflation pressure during step (H); and,
step (J) comprises the step of: collecting mu-slip data for the first tire at the second inflation pressure during step (L).

10. The method of claim 1 wherein:
prior to step (M) the method comprises the steps of:
inflating the first tire to a third inflation pressure;
collecting mu-slip data for the first tire at the third inflation pressure; and,
mounting the first tire at the third inflation pressure to the first wheel; and,
step (M) comprises the step of: using the collected mu-slip data from the first tire at the third inflation pressure to: (1) determine the peak mu and the slip ratio at peak mu; and, (2) create the data curve of normalized mu versus time.

11. The method of claim 1 further comprising the steps of:
providing the vehicle with a second ABS controller that is operable to control braking of the first wheel;
providing the first tire at the first inflation pressure on the wheel;
defining a second tire-vehicle-ABS system as the combination of the vehicle, the second ABS controller and the first tire;
performing a first stopping distance test on the second tire-vehicle-ABS system while the first tire is at the first inflation pressure to create stopping distance data;
inflating the first tire to a second inflation pressure;
providing the first tire at the second inflation pressure on the wheel;
performing a second stopping distance test on the second tire-vehicle-ABS system while the first tire is at the second inflation pressure to create stopping distance data; and,
using the data curve of normalized mu versus time to calculate efficiency of the second tire-vehicle-ABS system.

12. The method of claim 1 wherein:
prior to steps (M) and (N) the method comprises the steps of:
inflating the first tire to a third inflation pressure;
collecting mu-slip data for the first tire at the third inflation pressure;
providing the first tire at the third inflation pressure on the wheel; and,
performing a third stopping distance test on the first tire-vehicle-ABS system while the first tire is at the third inflation pressure to create stopping distance data; and,
step (M) comprises the step of: using the collected mu-slip data from the first tire at the third inflation pressure to: (1) determine peak mu and slip ratio at peak mu; and, (2) create a data curve of normalized mu versus time.

13. The method of claim 1 wherein:
steps (M) and (N) are accomplished using a digital computer.

* * * * *